(12) United States Patent
Lee et al.

(10) Patent No.: US 8,960,024 B2
(45) Date of Patent: Feb. 24, 2015

(54) DIAPHRAGM TYPE DISPLACEMENT SENSOR DETECTING MOMENT

(75) Inventors: Chul-Sub Lee, Daegu (KR); Eul-Chul Byeon, Gyeonggi-do (KR); Beom-Kyu Kim, Seoul (KR); Young-Deok Kim, Seoul (KR)

(73) Assignee: Tyco Electronics Amp Korea Ltd., Kyungsangbuk-do (KR)

( * ) Notice: Subject to any disclaimer, the term of this patent is extended or adjusted under 35 U.S.C. 154(b) by 38 days.

(21) Appl. No.: 13/247,220

(22) Filed: Sep. 28, 2011

(65) Prior Publication Data
US 2012/0011942 A1 Jan. 19, 2012

Related U.S. Application Data (63) Continuation of application No. PCT/KR2010/001458, filed on Mar. 9, 2010.

(30) Foreign Application Priority Data

Apr. 14, 2009 (KR) .................. 10-2009-0032423

(51) Int. Cl.
G01L 1/04 (2006.01)
G01L 1/22 (2006.01)
G01B 7/16 (2006.01)

(52) U.S. Cl.
CPC .............. G01B 7/18 (2013.01); G01L 1/2231 (2013.01)
USPC .................................. 73/862.634

(58) Field of Classification Search
CPC ................ G01B 7/18; G01L 1/2231
USPC .............. 73/862.627, 862.621, 862.625, 73/862.381, 826.634, 826.472, 862.634, 73/631
See application file for complete search history.

(56) References Cited

U.S. PATENT DOCUMENTS

| 3,665,756 | A | * | 5/1972 | Russell | 73/766 |
| 6,891,680 | B2 | | 5/2005 | Sato | |
| 7,210,362 | B2 | * | 5/2007 | Tsutaya | 73/862.627 |
| 7,441,470 | B2 | * | 10/2008 | Morimoto | 73/862.045 |

FOREIGN PATENT DOCUMENTS

| CN | 1529144 A | 9/2004 |
| CN | 201138191 Y | 10/2008 |
| JP | 58066803 A | 4/1983 |

(Continued)

OTHER PUBLICATIONS

PCT International Search Report, International Application No. PCT/KR2010/001458, International filing date Mar. 9, 2010, 3 pages.

(Continued)

Primary Examiner — Lisa Caputo
Assistant Examiner — Roger Hernandez-Prewit
(74) Attorney, Agent, or Firm — Barley Snyder (57) ABSTRACT

A displacement sensor having a sensing body, a strain gauge, and a signal processing unit. The sensing body having a diaphragm positioned at a lower surface of the sensing body and an input bar orthogonally fixed at a center of an upper surface of the sensing body. The strain gauge attaches to the diaphragm. The signal processing unit generates an electrical signal based on an output value of the strain gauge corresponding to strain of the diaphragm caused by moment of the input bar.

18 Claims, 8 Drawing Sheets

(56) References Cited

FOREIGN PATENT DOCUMENTS

| | | |
|---|---|---|
| JP | 5895201 | 6/1983 |
| JP | 2002118203 A | 4/2002 |
| KR | 20030040244 A | 5/2003 |

OTHER PUBLICATIONS

Chinese First Office Action and Search Report cited in co-pending Chinese Application No. 201080017264.8, issued Mar. 28, 2013, 17 pages.

\* cited by examiner

PRIOR ART

PRIOR ART

DIAPHRAGM TYPE DISPLACEMENT SENSOR DETECTING MOMENT

CROSS-REFERENCE TO RELATED APPLICATION

The application is a continuation of PCT International Application No. PCT/KR2010/001458 filed Mar. 9, 2010, which claims priority under 35 U.S.C. § 119 to Korean Patent Application No. 2009-0032423, filed Apr. 14, 2009.

FIELD OF THE INVENTION

The present invention relates to a displacement sensor, and more particularly, to a displacement sensor to measure displacement of a device based on moment of force acting on a diaphragm when the diaphragm undergoes displacement.

BACKGROUND

Figure 7:
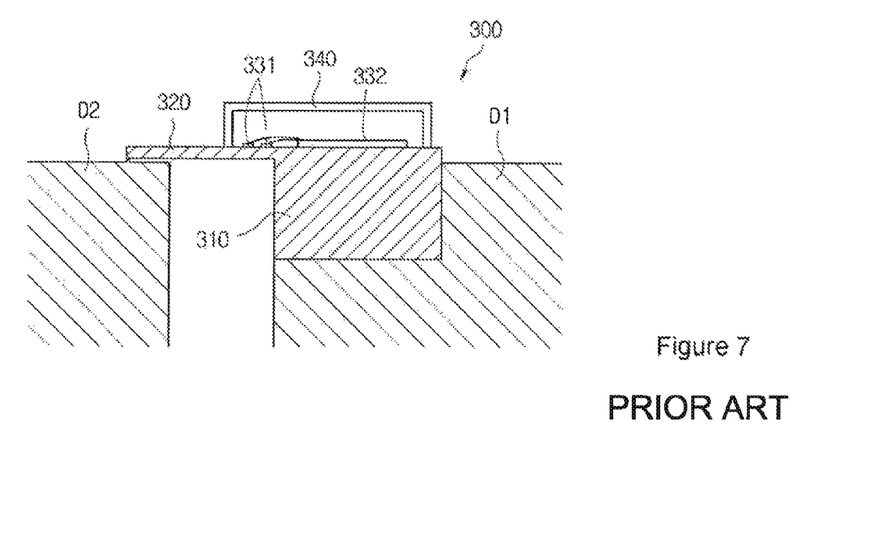
FIG. 7 is a sectional view showing a known displacement sensor.

An example of a known displacement sensor is illustrated in FIG. 7.

The illustrated known displacement sensor 300 includes a body 310 mounted to a mechanical device D1, an input bar 320 in the form of a cantilever integrally extending from the body 310, a distal end of which comes into contact with a partial region D2 of the mechanical device D1 so as to undergo displacement according to displacement of the partial region D2, a strain gauge 331 attached to the input bar 320, and an electric circuit board 332 to generate an electrical signal upon receiving a strain value measured by the strain gauge 331.

When the partial region D2 is moved upward, the input bar 320 is bent upward thus undergoing displacement. The strain gauge 331 and the electric circuit board 332 generate an electrical signal corresponding to the displacement of the input bar 320.

In the above described known displacement sensor 300, the strain gauge 331 is attached to the input bar 320 to attain a sufficient sensitivity. In addition, to prevent contamination due to impurities under specific use environments, a cover 340 is provided to maintain the strain gauge 331 and the electric circuit board 332 in an airtight condition.

In this case, to maintain the strain gauge 331 in an airtight condition, it is necessary to attach a part of the cover 340 to the input bar 320. However, this causes the cover 340 to undergo displacement along with the input bar 320, having an effect on a measured value of the strain gauge 331.

Moreover, the cover 340 may be unintentionally detached from the input bar 320 due to frequent deformation of the input bar 320.

Figure 8:
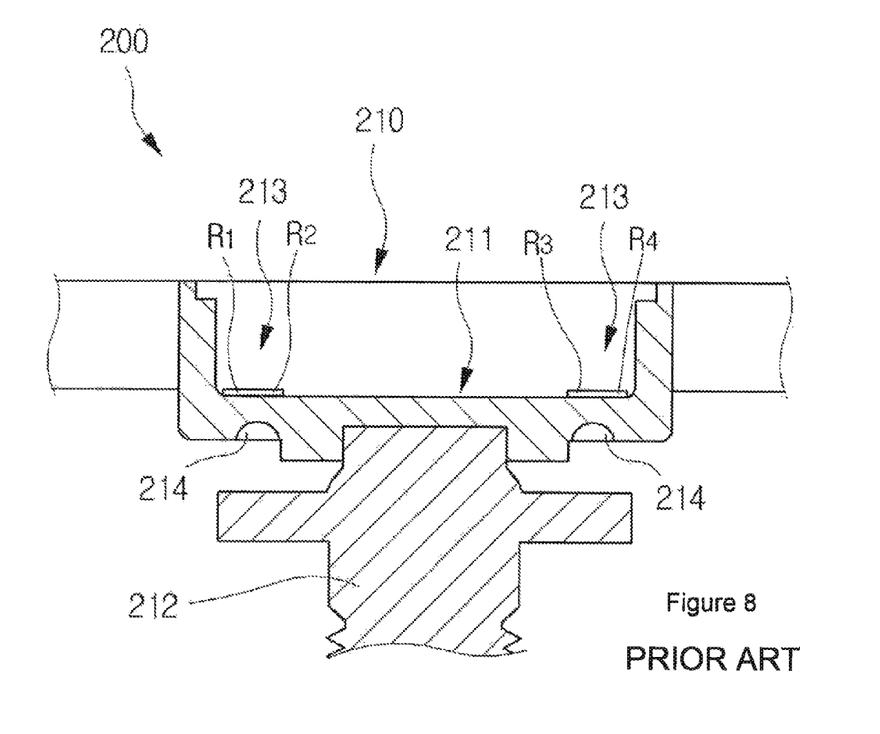
FIG. 8 is a sectional view showing a known load sensor.

FIG. 8 is a partial sectional view illustrating a known load sensor using a diaphragm, to which a strain gauge is attached.

The known load sensor 200 includes a sensing body 210, a diaphragm 211 positioned on the sensing body 210, and an input bar 212 positioned beneath the sensing body 210 to vertically press the diaphragm 211 by a weight thereof.

A strain gauge 213 is attached to the diaphragm 211. The strain gauge 213 includes a pair of first and second piezo-resistance elements $R_1$ and $R_2$ attached close to one side edge of the diaphragm 211, and a pair of third and fourth piezo-resistance elements $R_3$ and $R_4$ attached close to an opposite side edge of the diaphragm 211 so as to correspond respectively to the first and second piezo-resistance elements $R_1$ and $R_2$.

A notch 214 is indented in a lower surface of the sensing body 210 and acts to increase strain of the diaphragm 211.

Assuming that the input bar 212 is fixed at or comes into contact with a load occurrence position of a target device to be measured, the input bar 212 is mainly subjected to vertical force. In addition to the vertical force, the input bar 212 is typically subjected to horizontal force, twisting moment, etc, thus being under the influence of miscellaneous load including moment, torsion, etc.

When attempting to detect deformation of the diaphragm 211 caused by the vertical force to be measured using the strain gauge 213, deformation of the diaphragm 211 due to the miscellaneous load including moment, etc. may be detected simultaneously. Therefore, it is necessary to eliminate the miscellaneous load in order to measure only the vertical force.

Figure 9:
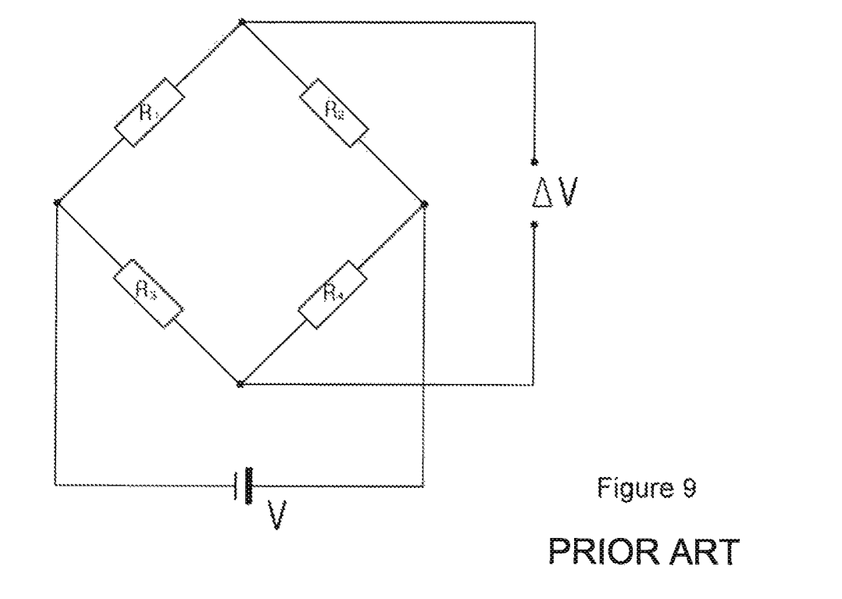
FIG. 9 is a schematic diagram of a Wheatstone bridge circuit provided in the load sensor shown in FIG. 8.

Accordingly, in a known solution, as shown in FIG. 9, a Wheatstone bridge circuit consisting of first to fourth piezo-resistance elements is used. The Wheatstone bridge circuit is configured such that strains measured by the piezo-resistance elements under the influence of moment offset each other and only deformation of the diaphragm caused by vertical force can be measured.

In the meantime, in the case where the known load sensor is used as a displacement sensor, it is necessary for the diaphragm to be oriented orthogonal to a surface of a mechanical device that undergoes displacement. This disadvantageously results in a limited installation position of the sensor.

In particular, if a possible installation space of the displacement sensor is limited, for example, if it is difficult, in the case of measurement of displacement of a vehicular electronic brake caliper, to attain a space required for the displacement sensor to be orthogonally attached to a displacement occurrence surface, the use of the displacement sensor may be impossible.

With relation to design of a sensor, it is important to provide the sensor with not only high strength, but also sufficient strain for stable amplification in a circuit. However, the sufficient strain and the high strength are conflicting characteristics from various viewpoints and thus, design trade-off is necessary. For this reason, when a displacement sensor is designed based on the conception of a load sensor that is adapted to receive force directly, the displacement sensor may entail a problematic strength, resulting in vulnerable sensor design. Accordingly, to enable stable measurement of displacement regardless of a maximum operating load, it is necessary to design a displacement sensor such that the role of the displacement sensor is limited to accurately measure slight displacement of a specific region of a structure and a system operating load is assigned to the structure. This is a principal intent of the displacement sensor design. This is also advantageous for acquisition of a sensor installation space because it is unnecessary to arrange the sensor on a transmission path of force. Accordingly, upon design of the sensor, a system designer should consider only an operational displacement portion of the structure that can be measured by the sensor.

In the meantime, the above described known diaphragm has a significantly limited strain gauge attachment area. This results in troublesome attachment of the strain gauge and increases generation of defective products due to a deviated attachment position of the strain gauge.

More specifically, to accurately measure strain using the strain gauge, the strain gauge must be attached to a linearly deformable region of the diaphragm. In the case of the above described known diaphragm, only a partial region immediately above the notch undergoes approximate linear deformation and thus, the strain gauge must be accurately attached to the partial region. Therefore, despite use of an automated machine, there always exists a risk of a deviated attachment position of the strain gauge due to fine shaking and thus, generation of defective products may be increased.

SUMMARY

Therefore, the present invention has been made in view of the above problems, and it is one object of the present invention to provide a displacement sensor, which enables measurement of displacement caused by moment even with use of a diaphragm to which a strain gauge is attached.

The displacement sensor having a sensing body, a strain gauge, and a signal processing unit. The sensing body having a diaphragm positioned at a lower surface of the sensing body and an input bar orthogonally fixed at a center of an upper surface of the sensing body. The strain gauge attaches to the diaphragm. The signal processing unit generates an electrical signal based on an output value of the strain gauge corresponding to strain of the diaphragm caused by moment of the input bar.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENT(S)

Hereinafter, functions, configurations and operations of a displacement sensor according to an exemplary embodiment of the invention will be described in detail with reference to the accompanying drawings.

Figure 1:
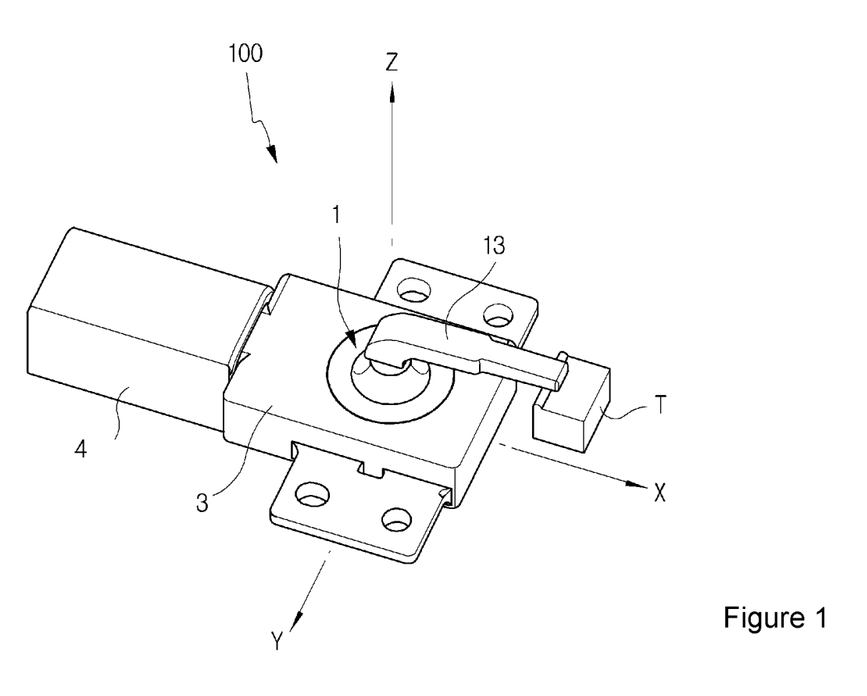
FIG. 1 is a perspective view showing a displacement sensor according to the invention.
Figure 2:
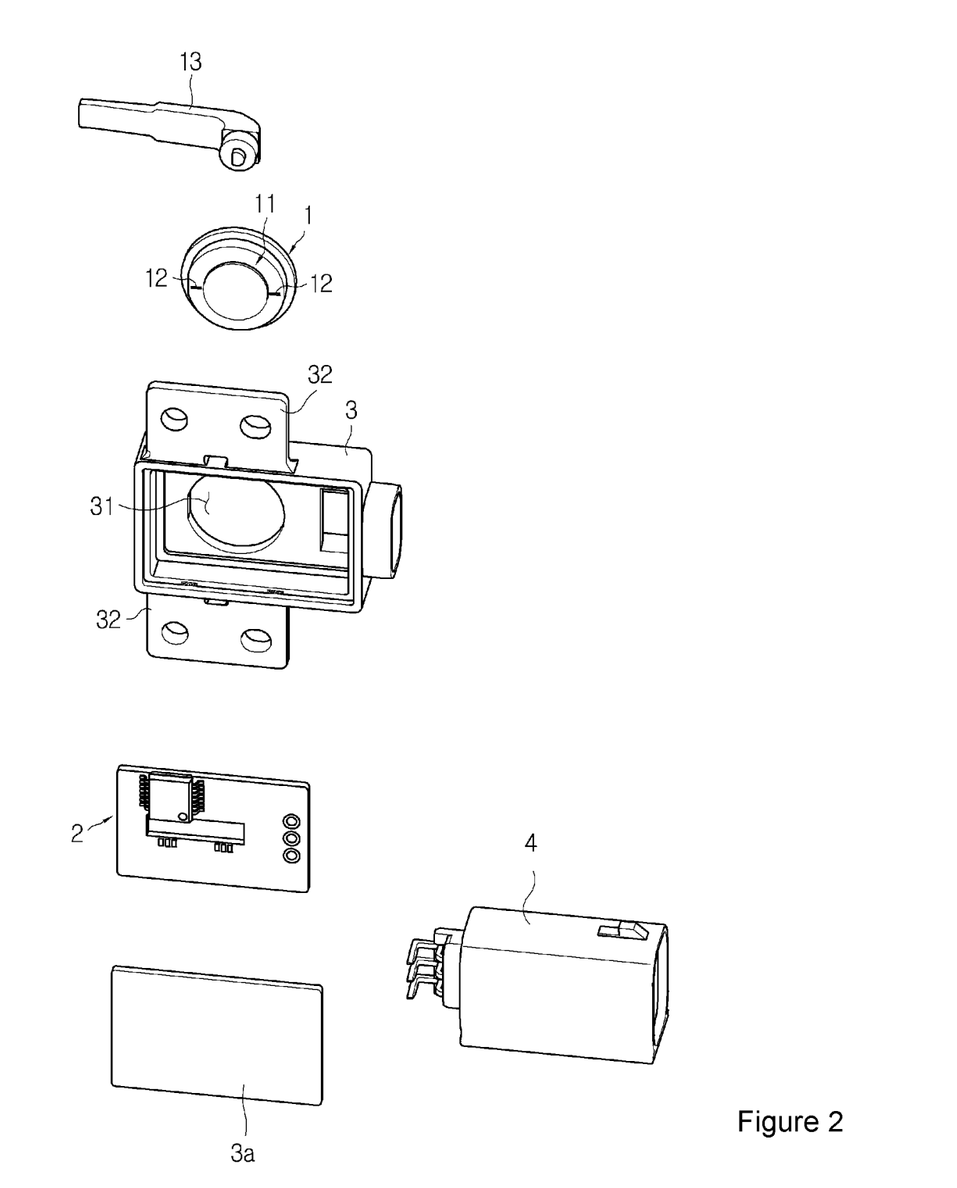
FIG. 2 is an exploded bottom perspective view of the displacement sensor shown in FIG. 1.

With respect to FIGS. 1 and 2, a displacement sensor 100 according to the invention includes a sensing body 1 and a signal processing unit 2. The sensing body 1 is positioned at a lower surface thereof with a diaphragm 11 to which a strain gauge 12 is attached, and an input bar 13 orthogonally fixed to the center of an upper surface thereof, to which displacement of a mechanical device is transmitted. The strain gauge 12 serves to measure strain of the diaphragm 11 caused by moment of the input bar 13, and the signal processing unit 2 generates an electrical signal based on a strain value output from the strain gauge 12.

The displacement sensor 100 may further include a housing 3 in which the diaphragm 11 of the sensing body 1 and the signal processing unit 2 are received, and a connector 4 to receive the electrical signal generated by the signal processing unit 2. The housing 3 has an opening 31 for coupling of the diaphragm 11, and the signal processing unit 2 is encased within the housing 3 so as not to be contaminated by impurities.

The housing 3 may function to shield electromagnetic waves generated from other electronic devices, and may further have a flange 32 with screw receiving passageways to install the displacement sensor 100 to the mechanical device.

A cover 3a is attached to the housing 3 by welding in a final assembly stage. The cover 3a is a shield to improve Electro Magnetic Compatibility (EMC) characteristics and enables realization of a waterproof sensor. In addition, attachment of the cover 3a provides the housing 3 of the displacement sensor 100 with a closed box-shaped structure. With this configuration, when the displacement sensor 100 is mounted to a target object, i.e. the mechanical device, it is possible to prevent deformation of the flange 32, caused by, e.g., bolt tightening or flatness of a mounting surface of the mechanical device, from having an effect on the sensing body 1 and consequently, to reduce a mounting offset error, an important characteristic of the displacement sensor 100.

The input bar 13 has an L-shaped form consisting of an upper portion parallel to a horizontal plane of the diaphragm 11 and a lower portion orthogonal to the horizontal plane of the diaphragm 11. When a transmission member T, which constitutes a part of the mechanical device and comes into contact with one end of the input bar 13, is moved upward, the other end of the input bar 13 fixed to the sensing body 1 undergoes moment. The moment causes deformation of the diaphragm 11 of the sensing body 1 and the strain gauge 12 measures strain of the diaphragm 11.

Figure 3:
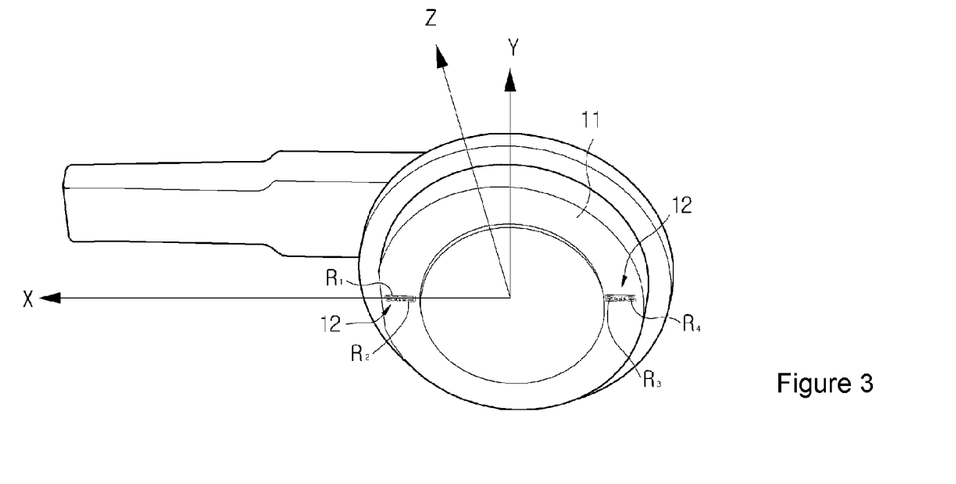
FIG. 3 is a perspective view showing a diaphragm and an input bar of the displacement sensor shown in FIG. 1.
Figure 4:
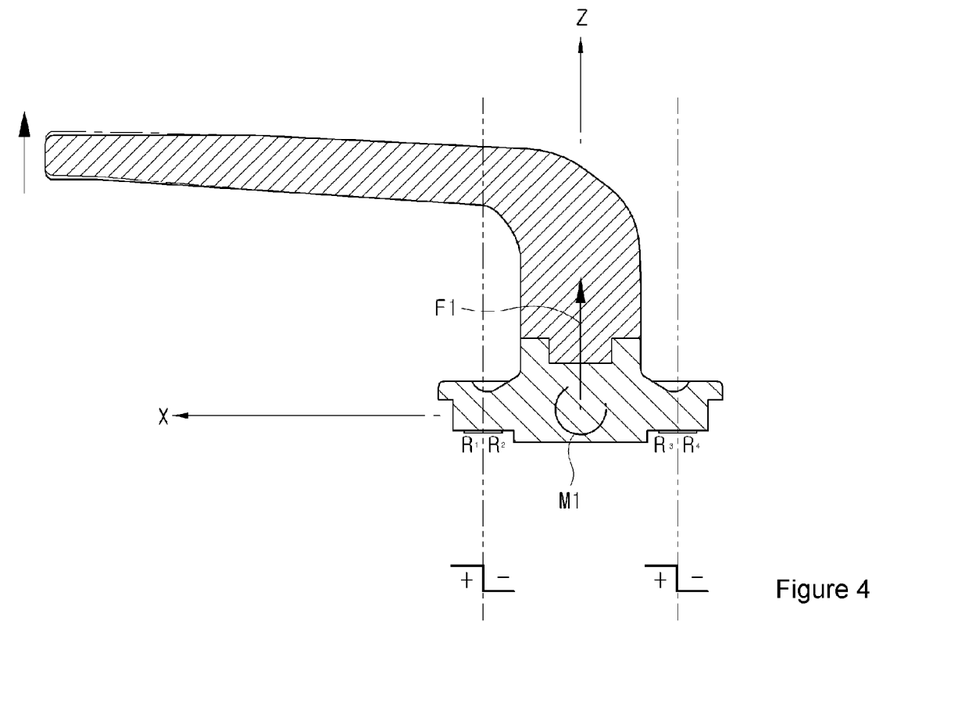
FIG. 4 is a sectional view of the diaphragm and the input bar shown in FIG. 3.

With respect to FIGS. 3 and 4, the strain gauge 12 attached to the diaphragm 11 is arranged parallel to moment generation direction by the input bar 13. The strain gauge 12 includes first to fourth piezo-resistance elements $R_1$, $R_2$, $R_3$ and $R_4$, which are sequentially attached to an imaginary line passing through the center of the diaphragm 11 such that the first and second piezo-resistance elements $R_1$ and $R_2$ are symmetrical respectively to the third and fourth piezo-resistance elements $R_3$ and $R_4$.

In FIG. 1, a longitudinal direction of the L-shaped input bar 13 is referred to as an X-axis. Also, a Y-axis is orthogonal to the X-axis and is parallel to the plane of the diaphragm 11, and a Z-axis is orthogonal to the X-axis and Y-axis directions.

Assuming that the transmission member T is moved upward in the Z-axis direction, the diaphragm 11 undergoes moment M1 about a rotation axis, i.e. the Y-axis in an X-Z plane. Accordingly, as illustrated in FIG. 3, the piezo-resistance elements $R_1$, $R_2$, $R_3$ and $R_4$ of the strain gauge 12 are attached parallel to one another in an X-axis direction in which the diaphragm 11 undergoes maximum deformation under the influence of the moment M1. In this case, the strain gauge 12 can measure maximum strain of the diaphragm 11 caused by the moment M1, resulting in an accurate measured value.

In FIG. 4, when displacement of the transmission member T is transmitted such that the distal end of the input bar 13 is moved upward, moment is generated causing the first piezo-resistance element $R_1$ and the third piezo-resistance element $R_3$ to be tensioned (lengthened) and the second piezo-resistance element $R_2$ and the fourth piezo-resistance element $R_4$ to be compressed (shortened). On the contrary, when the displacement is transmitted such that the distal end of the input bar 13 is moved downward, moment is generated in an opposite direction thus causing the first piezo-resistance element $R_1$ and the third piezo-resistance element $R_3$ to be compressed (shortened) and the second piezo-resistance element $R_2$ and the fourth piezo-resistance element $R_4$ to be tensioned (lengthened) (See the following Table 1).

Figure 5:
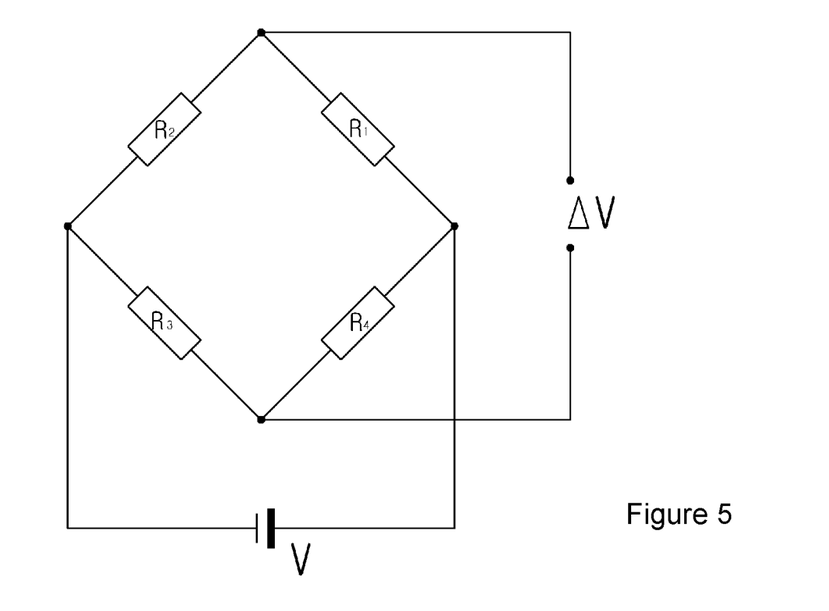
FIG. 5 is a schematic diagram of a Wheatstone bridge circuit provided in the displacement sensor shown in FIG. 1.

The signal processing unit 2 includes a Wheatstone bridge circuit as shown in FIG. 5, and generates an electrical signal based on the above described displacement as represented in the following Equation 1.

$$\frac{\Delta V}{V} = \frac{R_1 R_3 - R_2 R_4}{(R_1 + R_2)(R_3 + R_4)},$$

$$\frac{\Delta V}{V} = \frac{K}{4}(\varepsilon_1 - \varepsilon_2 + \varepsilon_3 - \varepsilon_4)$$

Equation 1

Here, $R_1$, $R_2$, $R_3$ and $R_4$ are resistance values corresponding to the respective piezo-resistance elements, K is a fixed proportional constant value representing a gauge factor, and $\epsilon_1$, $\epsilon_2$, $\epsilon_3$, and $\epsilon_4$ are strain values measured by the respective piezo-resistance elements.

The Wheatstone bridge circuit having the above described configuration generates an electrical signal having a positive (+) value calculated by the above Equation 1 when the displacement is transmitted such that the distal end of the input bar 13 is moved upward, but generates an electrical signal having a negative (−) value when the displacement is transmitted such that the distal end of the input bar 13 is moved downward.

In the meantime, the Wheatstone bridge circuit according to the present invention eliminates vertical force which is applied to the diaphragm 11 along with the moment. That is, the Wheatstone bridge circuit is operated to eliminate vertical force while amplifying moment. The moment amplifying displacement sensor 100 deals with vertical force as one of miscellaneous load.

More specifically, when the displacement is transmitted such that the distal end of the input bar 13 is moved upward, there occurs force F1 that vertically raises the center of the diaphragm 11.

In this case, the first piezo-resistance element $R_1$ and the fourth piezo-resistance element $R_4$ are tensioned (lengthened) and the second piezo-resistance element $R_2$ and the third piezo-resistance element $R_3$ are compressed (shortened). In addition, it can be appreciated that the electrical signal calculated by the above Equation 1 has zero value because strain values of the symmetrically attached first and third piezo-resistance element $R_1$ and $R_3$ and strain values of the symmetrically attached second and fourth piezo-resistance element $R_2$ and $R_4$ have the same magnitude.

Even when the displacement is transmitted such that the distal end of the input bar 13 is moved downward, the sum of strain values of the first to fourth piezo-resistance elements may be zero and thus, the electrical signal calculated by the above Equation 1 has zero value.

The above described principle is summarized in the following Table 1.

TABLE 1

|  | $\epsilon_1$ | $\epsilon_2$ | $\epsilon_3$ | $\epsilon_4$ | Electrical Signal |
| --- | --- | --- | --- | --- | --- |
| First Case (+moment) | +value | −value | +value | −value | +value |
| Second Case (−moment) | −value | +value | −value | +value | −value |
| Third Case (Vertical Compression) | +value | −value | −value | +value | Zero value |

TABLE 1-continued

|  | $\epsilon_1$ | $\epsilon_2$ | $\epsilon_3$ | $\epsilon_4$ | Electrical Signal |
| --- | --- | --- | --- | --- | --- |
| Fourth Case (Vertical Tension) | −value | +value | +value | −value | Zero value |

Here, the first case represents strain caused by moment when the displacement is transmitted such that the distal end of the input bar 13 is moved upward, the second case represents strain caused by moment when the displacement is transmitted such that the distal end of the input bar 13 is moved downward, the third case represents strain caused when vertical compression force is applied to the input bar 13, and the fourth case represents strain caused when vertical tensile force is applied to the input bar 13.

As described above, the electrical signal generated by the signal processing unit 2 using the Wheatstone bridge circuit has a positive (+) value or a negative (−) value, and the magnitude of input displacement is calculated from the magnitude of the electrical signal. In addition, the Wheatstone bridge circuit eliminates force acing in a vertical direction of the diaphragm 11, enabling accurate calculation of displacement caused by moment.

Figure 6:
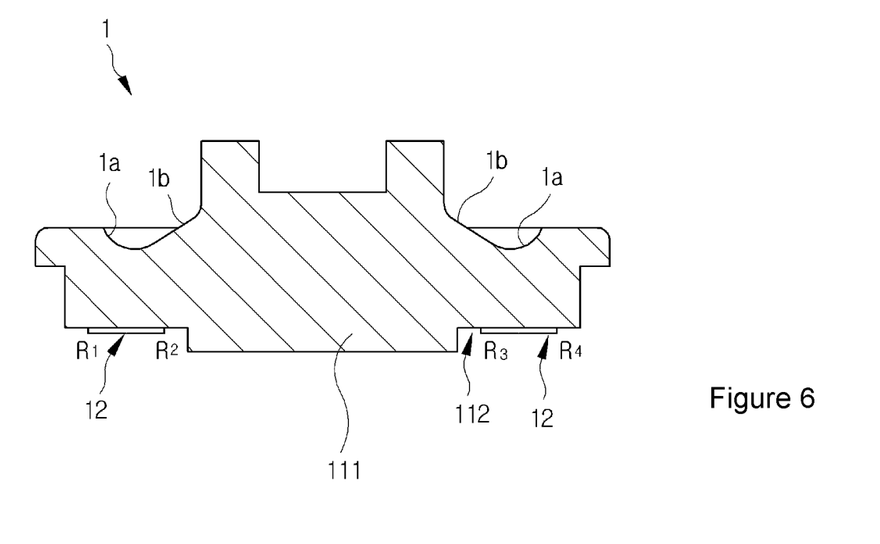
FIG. 6 is a sectional view of the diaphragm provided in the displacement sensor shown in FIG. 1.

With respect to FIG. 6, the sensing body 1 according to the invention has an annular notch 1a that is indentation in the upper surface thereof to amplify deformation of the diaphragm 11. In addition, the sensing body 1 has a slope 1b obliquely extending from the notch 1a toward a center of the upper surface thereof, the slope 1b serving to increase a linearly deformable area of the diaphragm 11. Specifically, the slope 1b extends by a predetermined inclination angle inward from the bottom of the notch 1a indented in the upper surface of the sensing body 1.

As the slope 1b is inclined by a predetermined angle with respect to the horizontal plane of the diaphragm 11, the diaphragm 11 undergoes linear deformation in the slope 1b.

This principle is known and is equal to that of a cantilever, which has a downwardly inclined upper surface and a horizontal lower surface, and is linearly deformed when downward shear stress is applied to a distal end of the cantilever.

In this case, as the linearly deformable area of the diaphragm 11 (where the strain gauge 12 is attached) increases, a tolerance range of an attachment position of the strain gauge 12 can be increased. This can reduce generation of defective products due to incorrect attachment of the strain gauge 12.

In the meantime, to enhance sensitivity of the displacement sensor 100 by amplifying detected values of the respective piezo-resistance elements $R_1$, $R_2$, $R_3$ and $R_4$ of the strain gauge 12, preferably, the diaphragm 11 is further provided with a disc-shaped protrusion 111 having the same center as that of the diaphragm 11.

With provision of the disc-shaped protrusion 111, the center region of the diaphragm 11 has a thickness greater than a thickness of the remaining region of the diaphragm 11. Consequently, the center region of the diaphragm 11 having the disc-shaped protrusion 111 is subjected to a smaller strain, whereas a peripheral region of the diaphragm 11 to which the strain gauge 12 is attached, i.e. an attachment surface 112 of the diaphragm 11 is subjected to a greater strain.

In this case, when the attachment surface 112 is subjected to greater strain, the displacement sensor 100 can perform more accurate measurement even slight moment variation with high sensitivity.

Various embodiments have been described in the best mode for carrying out the invention.

The present invention is applicable to a displacement sensor 100 to measure displacement caused by moment even with use of a diaphragm 11 to which a strain gauge 12 is attached.

As apparent from the above description, a displacement sensor according to the embodiment of the present invention has the following several effects.

Firstly, the displacement sensor 100 can measure displacement caused by moment even with use of a diaphragm 11 to which a strain gauge 12 is attached. Accordingly, the displacement sensor 100 has no limit in an attachment position thereof.

Secondly, the strain gauge 12 is attached to the diaphragm 11 in a direction parallel to a moment generation direction, so as to measure maximum strain of the diaphragm 11 caused by moment. As a result, the displacement sensor 100 can attain a strain value suitable for amplification by a circuit while maintaining an appropriate strength thereof.

Thirdly, with use of a signal processing unit 2 adopting a Wheatstone bridge circuit, vertical force applied to the diaphragm 11 simultaneously with moment can be eliminated and thus, can be excluded from the subject of measurement. This enables more accurate calculation of displacement caused by moment.

Fourthly, the diaphragm 11 has a slope to increase a linearly deformable area thereof. The increased linearly deformable area has the effect of increasing a tolerance range of an attachment position of the strain gauge 12, thus reducing generation of defective products due to incorrect attachment of the strain gauge 12.

Lastly, when the diaphragm 11 is centrally provided with a disc-shaped protrusion 111, a peripheral region of the diaphragm 11, to which the strain gauge 12 is attached, is subjected to greater strain, resulting in enhanced sensitivity.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A displacement sensor, comprising:
    a sensing body having a diaphragm disposed along a lower surface of the sensing body and a monolithic L-shaped input bar having a proximal end extending orthogonally into and fastened securely in position to a center of an upper surface of the diaphragm and a distal end extending substantially orthogonal to the proximal end;
    a strain gauge attached to the diaphragm and arranged parallel to the distal end; and
    a signal processing unit generating an electrical signal based on an output value of the strain gauge corresponding to strain of the diaphragm such that a force on the distal end results in a first moment of the monolithic L-shaped input bar that produces a second moment of the diaphragm having a direction equivalent as the first moment of the monolithic L-shaped input bar.

2. The displacement sensor according to claim 1, wherein the strain gauge includes a first piezo-resistance element, a second piezo-resistance element, a third piezo-resistance element and a fourth piezo-resistance element attached in sequence.

3. The displacement sensor according to claim 2, wherein the first and second piezo-resistance elements are respectively symmetrical to the third and fourth piezo-resistance elements.

4. The displacement sensor according to claim 3, wherein the electrical signal is proportional to a sum of a difference between the first and second piezo-resistance elements and a difference between the third and fourth piezo-resistance elements.

5. The displacement sensor according to claim 4, wherein the electrical signal is defined by the following equation:

$$\frac{\Delta V}{V} = \frac{K}{4}(\varepsilon_1 - \varepsilon_2 + \varepsilon_3 - \varepsilon_4);$$

wherein K is a proportional constant, and $\epsilon_1$ to $\epsilon_4$ are strain values measured by the first, second, third, and fourth piezo-resistance elements.

6. The displacement sensor according to claim 1, wherein the L-shaped input bar includes an upper portion extending parallel to an upper surface of the diaphragm and a lower portion extending orthogonal to the upper surface of the diaphragm.

7. The displacement sensor according to claim 6, wherein the sensing body includes an indentation positioned along the upper surface of the diaphragm.

8. The displacement sensor according to claim 7, wherein the indentation is an annular notch.

9. The displacement sensor according to claim 7, wherein the sensing body includes a slope extending obliquely from the indentation toward a center of the upper surface of the diaphragm.

10. The displacement sensor according to claim 6, wherein the diaphragm includes an attachment surface to which the strain gauge is attached and a disc-shaped protrusion having a same center as the diaphragm.

11. The displacement sensor according to claim 10, further comprising a housing having a diaphragm receiving passageway into which the diaphragm is inserted and secured.

12. The displacement sensor according to claim 11, wherein the housing encases the signal processing unit.

13. The displacement sensor according to claim 12, wherein the housing further includes a connector positioned at a side surface of the housing and connecting to the signal processing unit.

14. The displacement sensor according to claim 1, wherein the sensing body includes an indentation positioned along an upper surface of the diaphragm.

15. The displacement sensor according to claim 14, wherein the indentation is an annular notch.

16. A displacement sensor, comprising:
    a sensing body having a diaphragm with an annular notch disposed on an upper side thereof and a plurality of strain gauges disposed on a lower side thereof;
    a monolithic L-shaped input bar having a proximal end extending into and fastened securely to a center of an upper surface of the diaphragm and a distal end extending substantially orthogonal to the proximal end, wherein the monolithic L-shaped input bar causes a moment to the diaphragm, such that a first moment results on the monolithic L-shaped input bar when a force is applied to the distal end and produces a second moment of the diaphragm having a direction equivalent as the first moment; and
    a signal processing unit generating an electrical signal from the output value of the strain gauges.

17. The displacement sensor according to claim 16, wherein the annular notch has an asymmetrical shape having an obliquely extending slope.

18. The displacement sensor according to claim 17, wherein the obliquely extending slope is higher toward the center of the sensor body than an outer side of the sensor body.

* * * * *